INVENTOR
CALVIN B. BLAIR
BY
Fishburn & Gold
ATTORNEYS

June 1, 1965
C. B. BLAIR
3,186,567
SELF LOADING AND UNLOADING VEHICLE
Filed Dec. 21, 1962
5 Sheets-Sheet 2
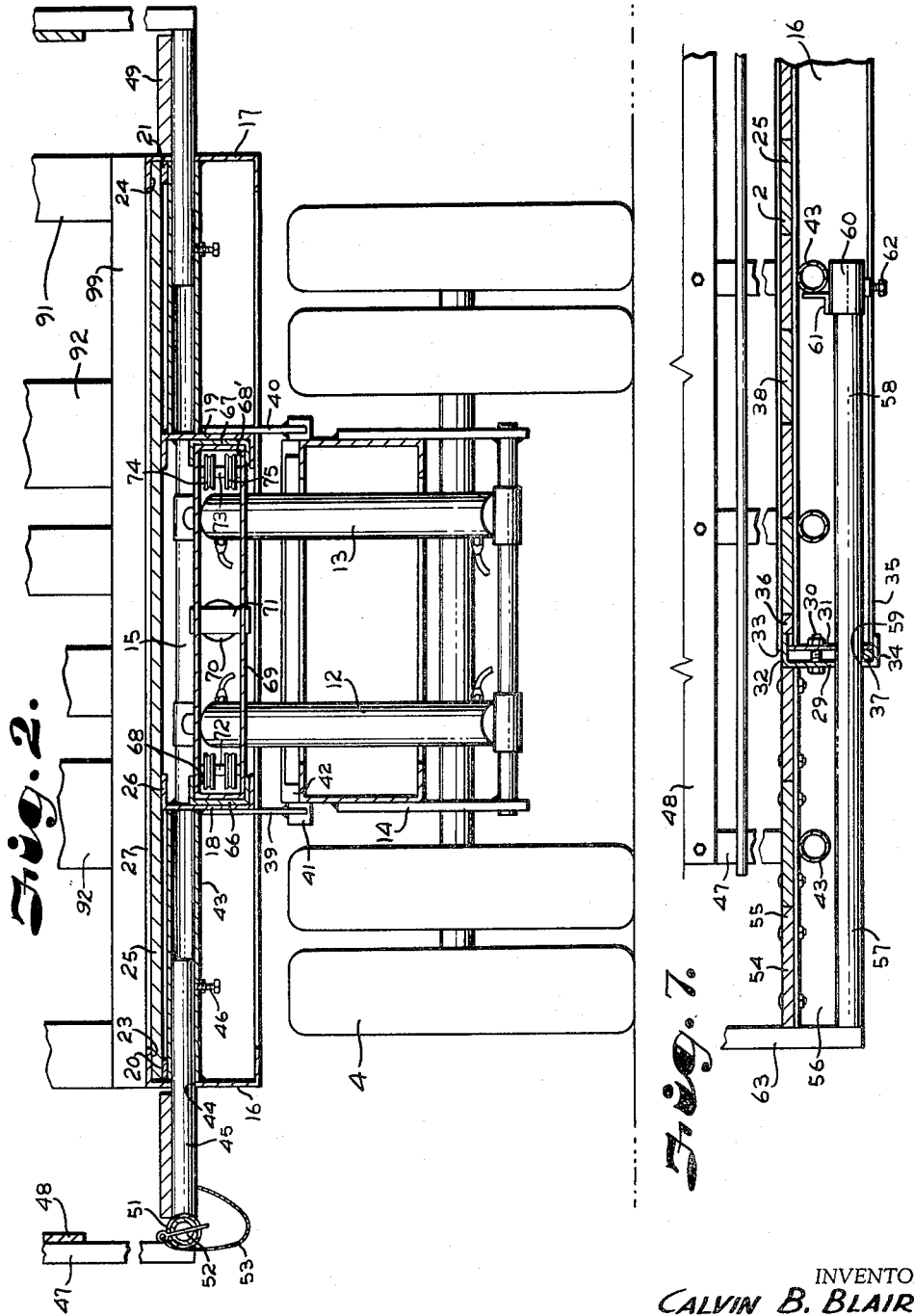
INVENTOR.
CALVIN B. BLAIR
BY
*Fishburn & Gold*
ATTORNEYS

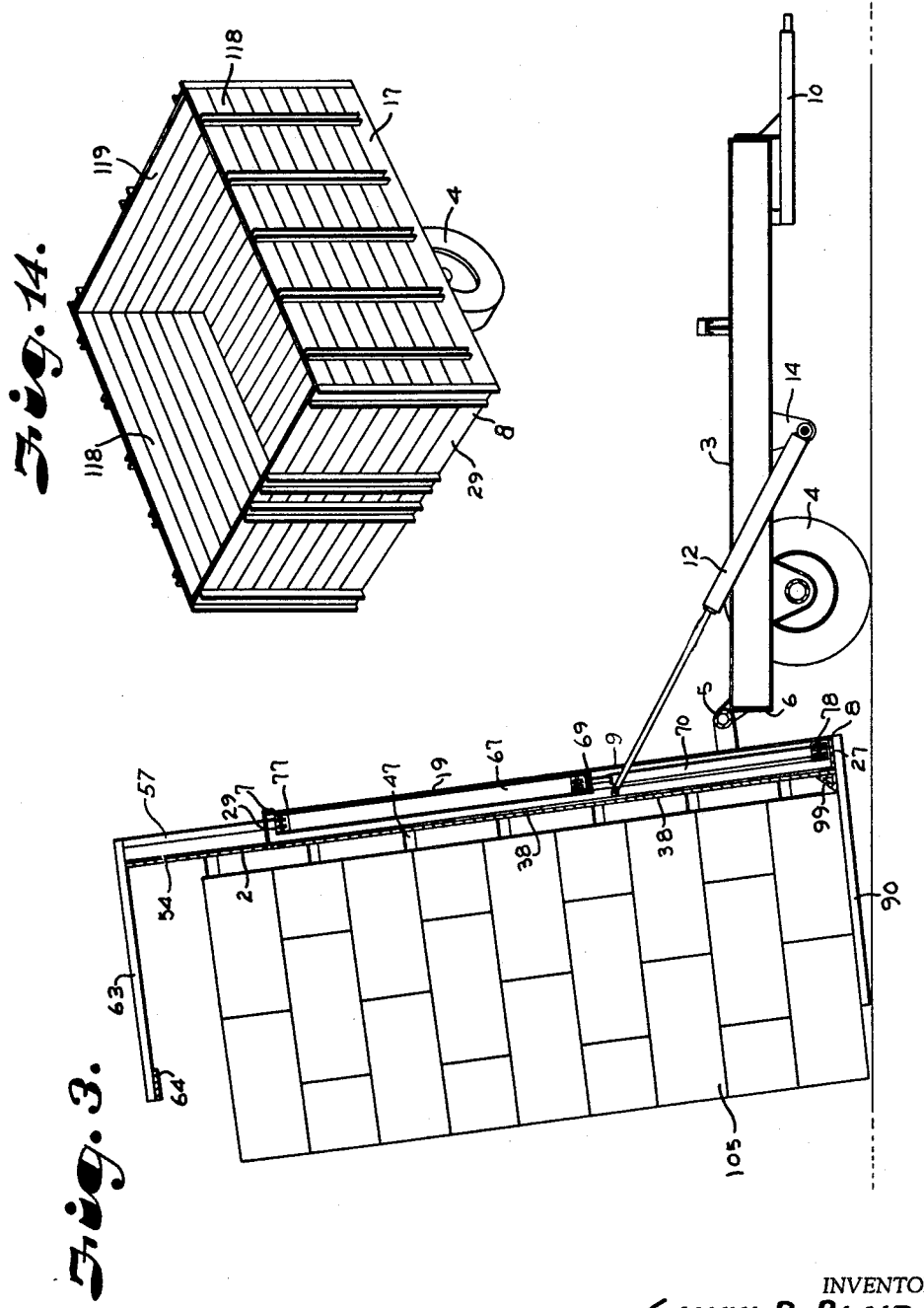

June 1, 1965   C. B. BLAIR   3,186,567
SELF LOADING AND UNLOADING VEHICLE
Filed Dec. 21, 1962   5 Sheets-Sheet 4
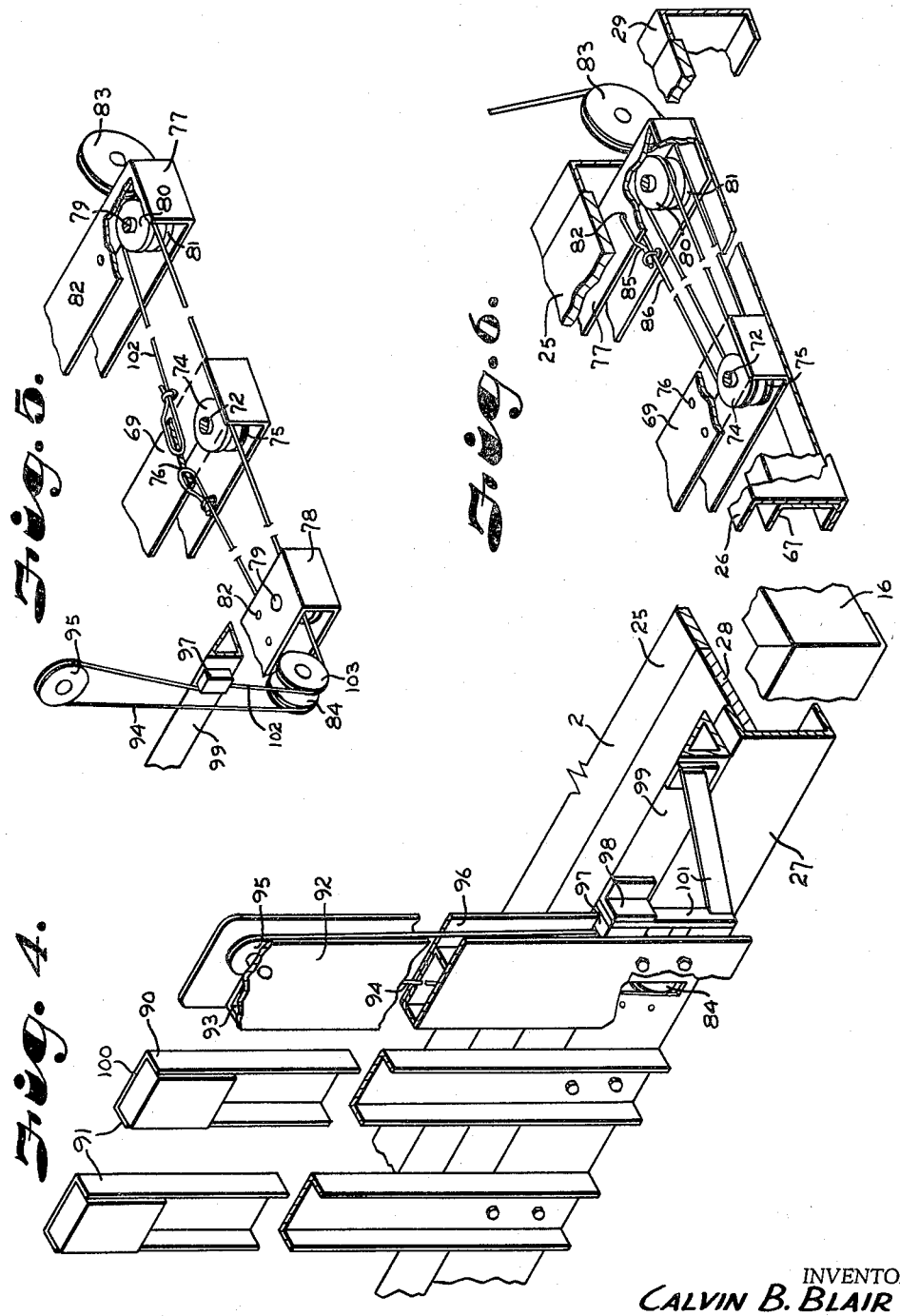
INVENTOR.
CALVIN B. BLAIR
BY
ATTORNEYS June 1, 1965
C. B. BLAIR
3,186,567
SELF LOADING AND UNLOADING VEHICLE
Filed Dec. 21, 1962
5 Sheets-Sheet 5
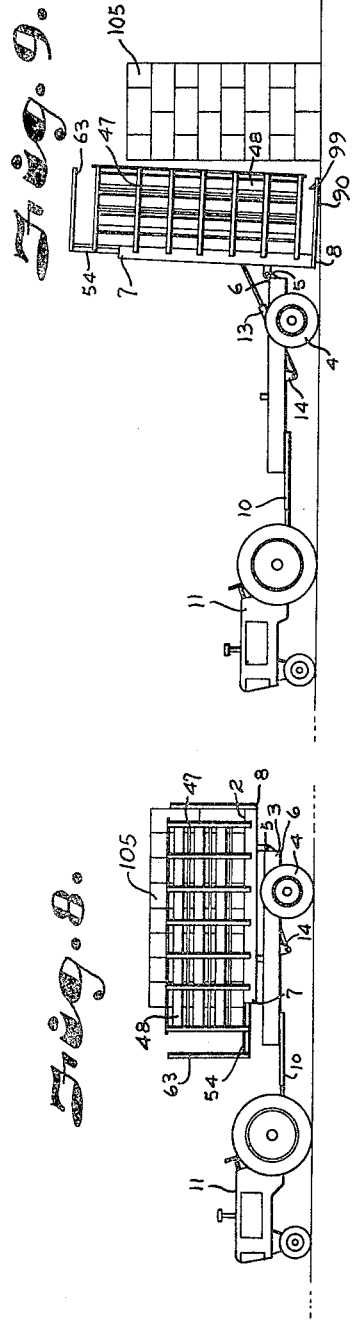
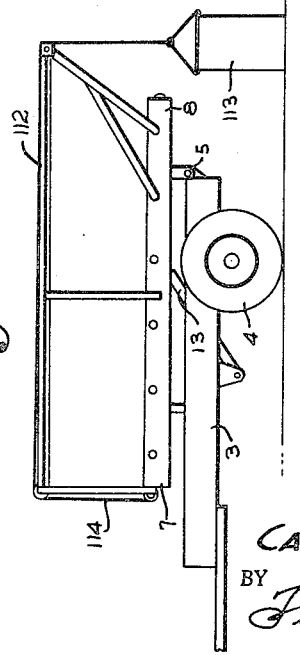
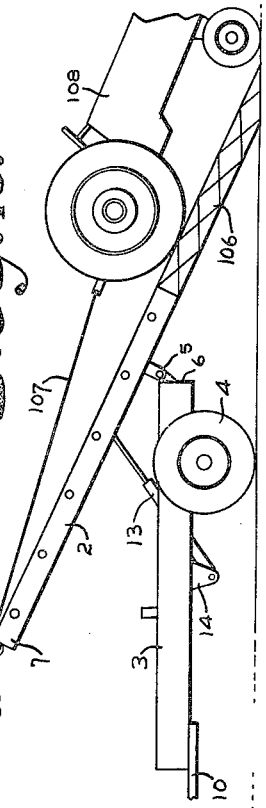
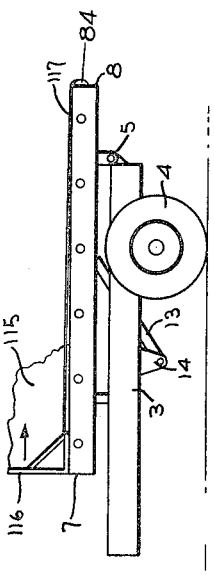
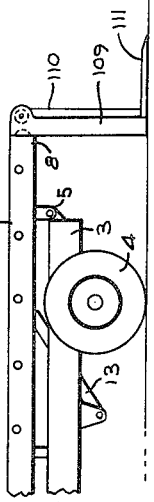
INVENTOR.
CALVIN B. BLAIR
BY
Fishburn and Gold
ATTORNEYS

United States Patent Office 3,186,567
Patented June 1, 1965

3,186,567
SELF LOADING AND UNLOADING VEHICLE
Calvin B. Blair, Box 76, Barnard, Kans.
Filed Dec. 21, 1962, Ser. No. 246,513
1 Claim. (Cl. 214—510)

This invention relates to wheeled vehicles and more particularly to self loading and unloading wagons.

Successful farming operations and other enterprises often require as many as three or four different specialized wagons to perform various tasks such as loose grain hauling, hay bale hauling and stacking, machinery loading and hauling, ensilage hauling and unloading, and the loading and hauling of hard-to-handle items such as barrels and heavy equipment requiring vertical lift tailgates or boom and trolley mechanisms.

The principal objects of the present invention are: to provide a utility wagon or vehicle which is easily and efficiently adaptable to perform many substantially unrelated loading, hauling and unloading jobs; to provide such a vehicle having a bed which is easily expandable and contractable in length and width so as to maintain legal size for over-the-road hauling but efficiently haul light weight, bulky loads in the field; to provide such a vehicle requiring no nails, bolts or other fastening devices to secure grain tight easily repairable plank floor; to provide such a vehicle bed wherein the floor is easily compressed to compensate for variations in plank dimensions due to drying; to provide such a vehicle wherein the side boards may be easily converted from light-weight open panel construction suitable for bulky material such as baled hay to solid panel construction suitable for grain hauling, or a combination of open and closed panel construction for hauling livestock; to provide such a wagon having a bed adapted to tilt to various angles to cooperate with extensions fixed to the rear thereof for convenience in loading heavy or bulky objects without the necessity of a raised dock; to provide such an apparatus which has a power member operably associated with fixed and movable pulleys located on the bed whereby cables may be pulled in various directions and with varying mechanical advantages to load and unload said bed; to provide such wagon loading apparatus which is easily adapted for powering auxiliary lifting devices such as elevating tailgates or boom and trolley mechanisms; to provide such a vehicle having a removable load slide tailgate attached to the rear of the bed and having a push bar slidably engaged therewith for slidably urging a stack of bales supported by the tailgate onto the ground when the bed is pivoted rearwardly; to provide such a tailgate push bar which may extend across the entire width of the bale stack for efficient application of pressure without disturbing bales and which travels the entire length of the gate for complete bale disengagement; to provide such a wagon wherein the bed tilting members and cable pulling members are conveniently and safely located in positions where they do not interfere with the wheel supporting frame or bed access; and to provide a versatile self loading and unloading vehicle which is simple and inexpensive in construction, light in weight, and yet rugged and easily maintained in use.

Other objects and advantages of this invention will become apparent from the following description taken in connection with the accompanying drawings wherein are set forth by way of illustration and example certain embodiments of this invention.

FIG. 2 is a transverse vertical cross-sectional view through the apparatus of FIG. 1 showing details of the bed tilting and cable pulling mechanisms and expandable sideboard structure.

FIG. 3 is a longitudinal cross-sectional view through the apparatus of FIG. 1 in tilted bale stack unloading position particularly showing the relationship between stationary and movable pulley boxes beneath the bed.

FIG. 4 is a fragmentary perspective view on an enlarged scale of a power unloading, bale stack supporting tailgate forming a part of the apparatus embodying this invention.

FIG. 5 is a fragmentary perspective view illustrating one pattern of cable threading or lacing through the movable and stationary pulley boxes.

FIG. 6 is a fragmentary perspective view of a second cable lacing pattern useful for jobs where relatively light tensile loads but long pulling distances are required.

FIG. 7 is a vertical fragmentary cross-sectional view showing a length extending platform mounted on the front of the bed.

FIG. 8 is a side elevational view on a reduced scale showing a load of hay bales in hauling position on the apparatus bed.

FIG. 9 is a side elevational view on a reduced scale showing the hay bale stack on the ground after being pushed from the power unloading tailgate following the position shown in FIG. 3.

FIG. 10 is a side elevational view on a reduced scale showing a rear extension secured to the tilted apparatus bed in place of the power unloading tailgate for loading objects from a ground resting position.

FIG. 11 is a fragmentary side elevational view on a reduced scale showing a power elevating tailgate mounted on the apparatus bed.

FIG. 12 is a side elevational view on a reduced scale showing a boom and trolley mechanism mounted on the apparatus bed for loading heavy barrels and the like.

FIG. 13 is a side elevational view on a reduced scale showing a slidable pushing gate structure on the bed for unloading bulky material such as ensilage.

FIG. 14 is a perspective view on a reduced scale of the apparatus adapted with closed panel side and end boards and adjusted over-the-road bed size for hauling grain.

Figure 1:
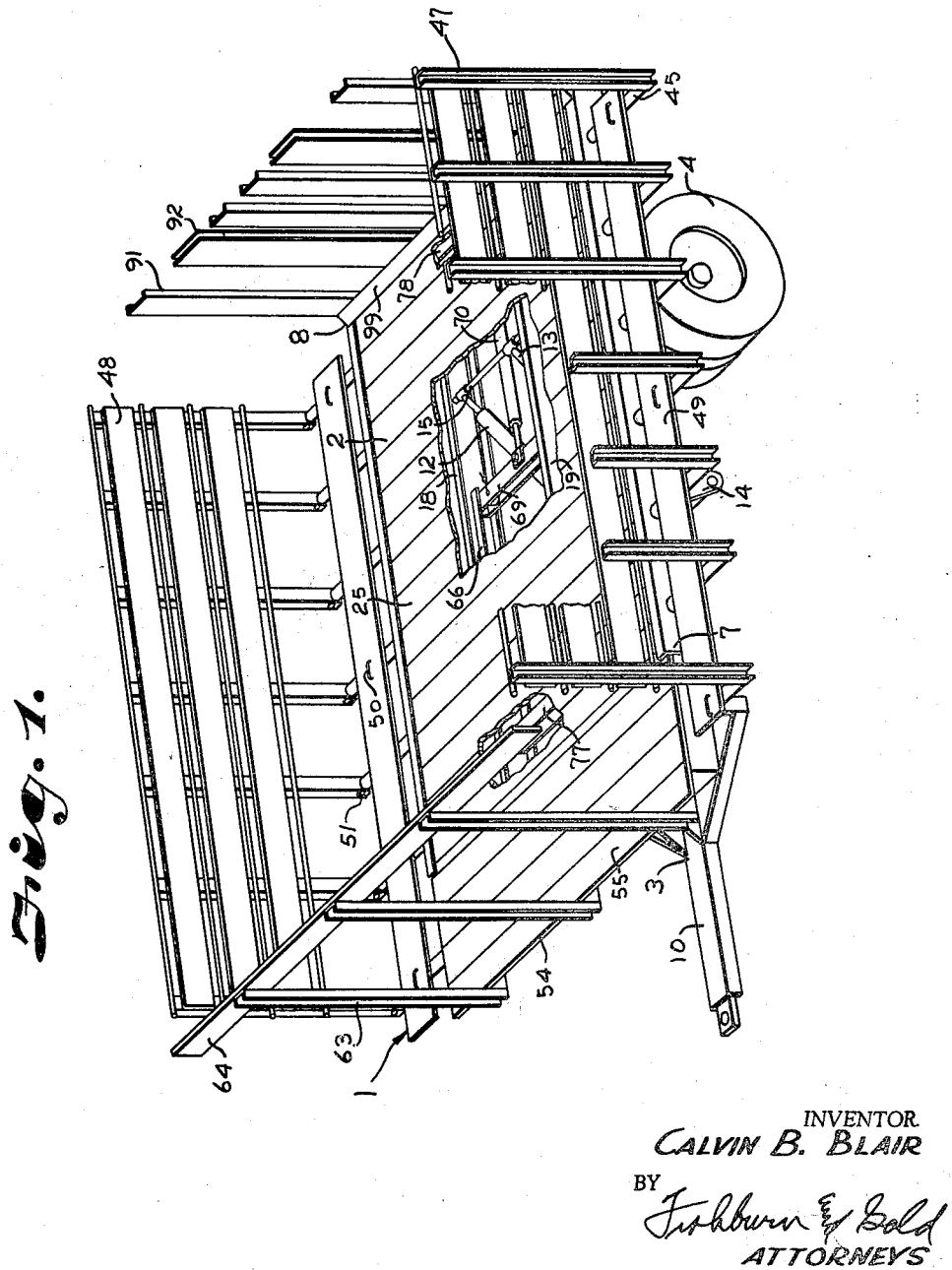
FIG. 1 is a perspective view of apparatus embodying this invention adapted for receiving, transporting and stacking hay bales with portions broken away to show power lift and cable pulling mechanisms thereon.

Referring to the drawings in more detail:

The reference numeral 1 generally indicates a versatile wagon apparatus embodying this invention. The apparatus 1 comprises a bed broadly designated 2 and described in detail hereinafter mounted on a frame 3 preferably having dual wheels 4. The bed 2 is normally supported by the frame 3 spaced above the ground as best illustrated in FIG. 8 and a pivotal connection 5 between the bed 2 and frame 3 permits the bed to pivot from a substantially horizontal position as shown in FIG. 8 through a vertical position as best illustrated in FIG. 9. The pivotal connection 5 is located at the rear 6 of the frame 3 but is intermediate the front 7 and rear 8 of the bed 2 at the under side 9 thereof. The intermediate position of the pivotal connection 5 on the bed 2 causes the bed rear 8 to terminate near the ground when the bed is moved to a generally vertical position, FIG. 9. It is noted that the pivotal connection 5 is constructed so as to provide clearance between the bed underside 9 and the rear 6 of the frame 3 whereby the bed may actually be pivoted past the vertical position over an angle of greater than 90° from the horizontal position shown in FIG. 8 for reasons which will be discussed hereinafter.

The frame 3 has a forwardly extending coupling member 10 of any suitable type, preferably of the type designed for rapid engagement with standard hitches for connection to suitable pulling equipment, in the illustrated example a farm tractor 11. It is to be understood, however, that the apparatus described herein is suitable for high speed over-the-road hauling in which case a conventional truck may be used as the pulling equipment.

Laterally spaced parallel extensible hydraulic bed pivoting cylinders 12 and 13 are pivotally connected at opposite ends thereof to depending lugs 14 fixed to the frame 3 and to a rigid cross bar 15 welded to the bed 2. The cylinders 12 and 13 are preferably remotely controlled from the tractor 11 and are extensible to a length permitting the pivoting of the bed 2 from the horizontal position illustrated in FIG. 8 through an angle of approximately 110° to the position shown in FIG. 9. The depending lugs 14 constantly maintain the cylinders 12 and 13 at an angle with respect to the bed 2 whereby regardless of the position of the bed 2 a substantial component of force may always be applied to induce pivoting of the bed about the pivotal connection 5. Further, for reasons explained hereinafter, the cylinders 12 and 13 are of the type controllable whereby the bed 2 may be maintained at any intermediate pivotal position, for example at an angle of 30° with the frame 3.

Referring more specifically to the construction of the wagon bed 2, elongated longitudinally extending outer channels 16 and 17 form the exterior sides of the bed and lend great structural strength thereto. Spaced apart inner structural channels 18 and 19 also extend longitudinally of the bed and are located in flange facing position between the outer channels 16 and 17. Elongated strips 20 and 21 are welded respectively to the outer channels 16 and 17 and run parallel to and beneath the upper flanges 22 thereof forming facing elongated open pockets or troughs 23 and 24 respectively for receiving transversely extending floorboards 25 in longitudinal edge contacting relation. Upper flanges 26 of the inner channels 18 and 19 are located in alignment with the strips 20 and 21 whereby the floorboards 25 rest in level fashion on the inner channels 18 and 19, the boards 25 being securely retained against upward displacement by the outer channel upper flanges 22.

A channel 27 extends transversely of the bed 2 and is suitably secured, preferably by welding, to the channels 16, 17, 18, and 19 at the rear 8 of the bed. The channel 27 forms an end abutment which the first inserted board 28 of the floorboards 25 engages for limiting the rearward travel of the floorboards in the pockets or troughs 23. A channel 29 extends transversely of the bed 2 across the bed front 7 and is mounted adjacent the front ends of the channels 16, 17, 18 and 19 by means of suitable bolts 30 extending into fixed ears 31. The upper flange 32 of the channel 29 extends into the pockets or troughs 23 and 24 at the open forward ends 33 thereof and the lower flange 34 of the front channel 29 telescopes over the bottom flanges 35 of the channels 16, 17, 18 and 19. A floorboard strip 36 of suitable width is placed in the pockets or troughs 23 in contact with the upper flange 32 and, if desired, a suitable insert or spacer 37 may be placed between the channel 29 and the ends of the channels 16, 17, 18 and 19 to prevent the channel 29 from tilting or cocking as the bolts 30 are tightened. By tightening the bolts 30 transverse pressure is applied onto the floorboards 25 for securely abutting the side edges together which produces a grain tight bed floor 38. If the floorboards 25 loosen up due to drying out it is only necessary to replace the floorboard strip 36 with one of appropriate width in order to take up the slack produced. Likewise it is a simple matter to replace a broken or otherwise damaged floorboard by removing the channel 29 and sliding out floorboards until the damaged one is removed and then filling the space with an undamaged board. Note that no individual fasteners are required for the respective floorboards.

Spaced apart bed supporting ears 39 and 40 are welded to the inner channels 18 and 19 respectively and depend therefrom. The ears 39 and 40 are welded to a transverse shaft 41 rotatably mounted in a sleeve 42 fixed to the frame 3. The ears 39 and 40, shaft 41 and sleeve 42 form the pivotal connection 5 noted above between the bed and frame.

Parallel transversely extending pipes or tubes 43 are welded to and extend respectively between longitudinally extending channels 16 and 18 and between longitudinally extending channels 17 and 19. The tubes 43 form spacing members between the respective channels and add structural strength to the bed 2. The outer channels 16 and 17 have suitable openings or bores 44 extending transversely through the webs thereof, the bores 44 having substantially the same inside diameter as the tubes 43 and being located to provide access from the outer sides of the bed into the tubes 43. Tubes 45 have an outside diameter slightly smaller than the inside diameter of the tubes 43 whereby they may be telescoped thereinto as best illustrated in FIG. 2. Set screws 46 extend through the tubes 43 and adapted to adjustably engage the tubes 45 to maintain same in desired laterally extending positions with respect to the bed 2. The tubes 45 are fixed to suitable vertically extending channels 47 which are maintained in fixed relation to each other by means of side panel boards 48. Thus, when hauling light bulky materials during situations when it is not necessary to stay within legal width limits for over-the-road travel, the sides of the wagon apparatus may be easily adjustably expanded to substantially greater transverse dimensions by merely releasing the set screws 46, telescoping the tubes 45 axially of the tubes 43 and subsequently tightening set screws 46. When the sides are expanded well beyond the outer channels 16 and 17 it is usually desirable to place suitable auxiliary floorboards 49 on the tubes 45 to provide a supporting floor extension. Suitable easily removable fasteners 50 may be used to maintain the floorboards 49 in place.

In some instances it is desirable to permit access to the bed 2 from the side thereof for certain loading operations such as the simultaneous depositing of several hay bales in a predetermined pattern whereupon a pivotal connection 51 is provided between certain of the channels 47 and tubes 45 whereby one side or a portion thereof may pivot outwardly and downwardly from the normal vertical position. Lock pins 52 are inserted in the pivotal connection 51 and are adapted for easy removal to permit the pivoting action. Chains 53 prevent the accidental loss of the pins 52.

If it is desired to extend the length of the bed 2, a bed extension assembly 54 (FIG. 7) is provided which comprises transversely extending floorboards 55 secured to spaced longitudinally extending angles 56. The angles 56 are fixed to spaced parallel longitudinally extending pipes or tubes 57 which extend rearwardly of the floorboards 55 a substantial distance as best illustrated at 58. The tubes 57 are received through suitable openings or bores 59 in the front channel 29 and extend into collars 60 anchored to selected tubes 43 with brackets 61. Set screws 62 extend through the collars 60 for retaining the extended portions 58 of the tubes 57 in the collars 60 against relative longitudinal motion. The front channel 29 and collars 60 act on the tubes 57 to maintain the floorboards 55 extending forwardly of and at the same level as the bed floor 38. Vertically extending forward angles 63 are suitably secured to the bed extension assembly 54 for supporting a railing 64 or suitable end panels as desired. The bed extension assembly 54 is easily removed by merely loosening the set screws 62 and withdrawing the tubes 57 from beneath the bed. If desired the side panels 48 may be extended past the bed front 7 and receiving tubes 65 mounted in transversely extending position on the bed extension 54 beneath the floorboards 55 to telescopically receive side tubes 45 in the same manner as the bed tubes 43.

Channels 66 and 67 are fixed in parallel spaced apart relation between the flanges of the respective structural bed channels 18 and 19 forming inwardly open guiding passageways 68 and 68' extending longitudinally of the frame bed beneath the bed floor 38. A forwardly and rearwardly open box structure or support member 69 is slidable longitudinally in the guiding passageways 68 and 68'. An hydraulic cylinder 70 is anchored at one end thereof to the rear channel 27 and at the other end thereof to a bracket 71 secured to the sliding box structure 69, whereby the extension or retraction of the hydraulic cylinder 70 produces a guided displacement of the box structure 69 longitudinally of the bed 2. Vertically extending shafts 72 and 73 are secured in the sliding box structure 69 in laterally spaced relation and rotatably support upper pulleys 74 and lower pulleys 75 therein. Cable anchor bores 76 extend through the box structure 69 adjacent the respective pulleys. Forward and rear box structures 77 and 78 are similar to the box structure 69 but are fixed in position in the guiding passageways 68 and 68' respectively adjacent the front and rear of the bed 2. The box structures 77 and 78 respectively have shafts 79 mounted therein in alignment with the shafts 72 and 73 and support upper pulleys 80 and lower pulleys 81, the box structures 77 and 78 also having suitable cable anchor holes 82 adjacent the pulleys mounted therein. Forward pulleys 83 are mounted for rotation about a horizontal axis adjacent the front of the bed 2 and are adapted to receive and direct cables described hereinafter from positions extending longitudinally of the bed through one or more of the box structures 69, 77 and 78 to the upper surface of the bed floor 38 for purposes described below. Similarly pulleys 84 are mounted adjacent the rear 8 of the bed for rotation about a horizontal axis.

By anchoring cables in suitable anchor holes 76 and/or 82 and threading or lacing cables over selected pulleys in the box structures 69, 77 and 78, a great variety of mechanical pulling advantages may be obtained for exertion in several directions depending upon the termination of the free ends of the cables. A specific example is illustrated in FIG. 6 wherein one end 85 of a pair of cables 86 is anchored in an anchor hole 82 on the fixed box structure 77, and the cables are then laced around the upper movable pulleys 74, the upper forward stationary pulleys 80, the lower movable pulleys 75, through the forward box structure 77, and over the forward pulleys 83 for securing to objects or apparatus such as described hereinafter for loading the bed 2. The cable configuration in FIG. 6, upon retraction of the hydraulic cylinder 70 causes a many-fold increase in the distance traveled of the cable free end 87 over the travel distance of the sliding box structure 69.

Referring to the various accessories of the apparatus, FIG. 4 illustrates a tailgate broadly designated 90 comprising a plurality of spaced channel shaped teeth 91 and a pair of box shaped teeth 92 all removably secured in cantilever fashion to the rear channel 27 and normally extending upwardly therefrom. The box teeth 92 have longitudinal passageways 93 formed therein for receiving cables 94 guided over the respective rear pulleys 84. The teeth 92 each include a rotatable pulley 95 at the outer end of the passageway 93 and adapted to redirect the cables 94 parallel to itself in grooves 96 for anchoring to guide blocks 97 longitudinally slidable with respect to the teeth 91 in the grooves 96. The guide blocks 97 are secured to brackets 98 fixed in spaced relation to a transversely extending elongated triangular push member 99. The push member 99 is slidably supported by the guide blocks 97 on the endgate 90 and is slidable therealong from a location contacting the bed 2 to a location adjacent the outer ends 100 of the tailgate in response to pull on the cables 94, FIG. 5. It is noted that the blocks 97 are free to slide past the pulleys 95 whereby the push member 99 is able to traverse the entire length of the teeth 91 and 92 for reasons apparent hereinafter. Suitable strengthening brackets 101 are fixed to the blocks 97 and push member 99 and telescope past the upper surface of the bed 2 permitting the push member 99 to rest snugly against the bed surface and yet exhibit high strength.

Referring to FIG. 5, one lacing pattern of the cables 94 is illustrated which is desirable when using the tailgate 90. This pattern comprises merely directing the cables 94 over the pulleys 84, through the rear box structure 78 and anchoring same onto the movable box structure 69. If desired a controlled return of the push member 99 may be accomplished by securing cables 102 to the blocks 97, directing same over pulley 103 mounted on the bed and rotating in parallel adjacent relation to the pulleys 84, threading same through the box structure 78, through the box structure 69, around the upper pulleys 80 of the forward box structure 77 and anchoring same to the movable box structure 69.

The tailgate 90, cooperating with the basic bed and wheeled frame structure described above has the ability to stack baled hay and the like more quickly and efficiently than heretofore and in tight, self-supporting, substantially weatherproof stacks. To accomplish this the apparatus is pulled through the field as illustrated in FIG. 8 and a suitable baled hay loader (not shown) is secured to the side for picking up bales of hay and delivering same onto the bed where a farm hand stacks same in alternately positioned pattern beginning against the tailgate and working forwardly of the bed, the farm hand finally standing on the bed extension assembly 54 when the apparatus is loaded with bales. The apparatus is then pulled to the desired stacking area where the cylinders 12 and 13 are actuated to tilt the bed approximately 110° from the horizontal whereby the stack rests entirely on the tailgate and slightly tipped rearwardly away from the bed. The outer ends 100 of the tailgate teeth contact the ground as best illustrated in FIG. 3 and the brakes of the pulling equipment and wheels 4 (if any) are normally disengaged. The hydraulic cylinder 70 is then actuated which causes the push member 99 to engage the lower inner edge 104 of the bale stack 105 whereupon the stack is pushed or slid onto the ground while the wagon apparatus is simultaneously pushed away from the stack to completely disengage the teeth 91 and 92 from beneath the stack. Subsequent stacks may be pushed tightly against preceding stacks by merely braking the pulling equipment until firm contact with the preceding stack is made and then permitting the push member 99 to urge the tractor and wagon apparatus forwardly from the stacks. The travel of the push member 99 over the entire length of the teeth 91 and 92 insures the complete disengagement of the stack.

Referring to FIG. 10, a wedge shaped extension 106 may be removably secured to the rear channel 27 after removing the endgate 90. By tilting the bed 2 to approximately 30° and using cables 107 threaded or laced in a manner such as described in connection with FIG. 6, heavy machinery such as a tractor 108 may be easily loaded onto the bed without additional power. In like manner the cables 107 may be formed into a large loop (not shown) for securing around a pile of bulky material such as loose hay (not shown) for pulling same onto the bed 2.

Referring to FIG. 11, an elevating tailgate 109 of any suitable design may be secured to the rear 8 of the bed 2 and cables 110 laced for vertically lifting the platform 111 thereof.

Referring to FIG. 12, a conventional "boom and trolley" mechanism 112 may be easily mounted on the bed 2 for lifting objects such as barrels 113 first vertically upwardly and then over the surface of the bed 2, the mechanism 112 being operated by cables 114 laced beneath the bed in an appropriate manner.

Referring to FIG. 13, a large pile of bulky material such as ensilage 115 may be easily unloaded from the bed 2 by resting a slidable gate 116 on the surface of the bed at the front 7 and anchoring cables 117 thereto which are laced in an appropriate manner to pull the gate 116 longitudinally across the surface of the bed.

If it is desired to pick up a stack of bales which have been previously stacked as illustrated in FIG. 9 suitable cables (not shown) may be encircled about the base of the stack for pulling onto the endgate 90 whereupon the bed may then be pivoted forwardly to place the stack in transporting position.

Referring to FIG. 14, closed side and end panels 118 and 119 may be easily mounted on the bed to form a grain tight enclosure for hauling grain and other fine loose materials without danger of loss due to leakage. Also, suitable modifications apparent to those skilled in the art may be made in the side and end panels for forming livestock racks. As noted above the bed is easily collapsible to legal over-the-road dimensions.

It is to be understood that while certain forms of this invention have been illustrated and described it is not to be limited to the specific form or arrangement of parts herein described and shown except insofar as such limitations are included in the claim.

What I claim and desire to secure by Letters Patent is:

A wagon apparatus adapted for stacking bales comprising:
(a) a bed and a wheeled frame for normally supporting said bed substantially horizontally and spaced above the ground, a connection between said bed and said frame permitting said bed to move from a substantially horizontal bale loading position to a generally vertical bale unloading position,
(b) power lift means connected between said frames and said bed for selectively moving said bed between said positions,
(c) a tailgate secured to said bed and extending generally at right angles thereto and upon which bales are adapted to rest when the bed is moved to said unloading position, said tailgate terminating in an outer end portion, said connection being intermediate the ends of said bed whereby said tailgate terminates adjacent the ground when said bed is in unloading position,
(d) a push member movably supported on said tailgate and movable therealong from a location adjacent said bed to a location adjacent said outer end portion of said tailgate,
(e) a force exerting member mounted on said apparatus and operably connected to said push member, said tailgate including a pulley rotatably mounted on said outer end portion, and a cable connecting said force exerting member to said push member, said cable engaging said pulley,
(f) said force exerting member comprising an extensible device mounted on the under side of said bed and including a support member slidably mounted on the under side of said bed and connected to said extensible device for sliding with respect to said bed in response to the extension of said extensible device, said support member engaging said cable for moving said push member, whereby a plurality of bales stacked on said bed may be upended by said lift means and subsequently pushed off the tailgate in upended position by said push member.

References Cited by the Examiner
UNITED STATES PATENTS

| | | | |
|---|---|---|---|
| 1,419,475 | 6/22 | Smith | 296—26 |
| 2,318,886 | 5/43 | Paiement | 214—82 |
| 2,421,128 | 5/47 | Pride. | |
| 2,530,350 | 11/50 | Ehlert | 214—82 |
| 2,578,802 | 12/51 | Heidrick et al. | |
| 2,647,649 | 8/53 | Maynard | 214—514 |
| 2,683,545 | 7/54 | Wood | 214—501 |
| 2,704,223 | 3/55 | Houdart | 296—26 |
| 2,730,249 | 1/56 | Edwards. | |
| 2,789,715 | 4/57 | Filipoff et al. | 214—517 |
| 2,851,174 | 9/58 | Lewis. | |
| 3,013,682 | 12/61 | Unruh | 214—501 |

HUGO O. SCHULZ, *Primary Examiner.*